(12) United States Patent
Sedlmayr

(10) Patent No.: US 7,119,312 B2
(45) Date of Patent: *Oct. 10, 2006

(54) MICROWAVE FLUID HEATING AND DISTILLATION METHOD

(76) Inventor: Steven R. Sedlmayr, 6538 N. 41st St., Paradise Valley, AZ (US) 85253

( * ) Notice: Subject to any disclaimer, the term of this patent is extended or adjusted under 35 U.S.C. 154(b) by 0 days.

This patent is subject to a terminal disclaimer.

(21) Appl. No.: 11/051,672

(22) Filed: Feb. 5, 2005

(65) Prior Publication Data
US 2006/0006172 A1  Jan. 12, 2006

Related U.S. Application Data

(60) Provisional application No. 60/586,675, filed on Jul. 9, 2004.

(51) Int. Cl.
H05B 6/72 (2006.01)
H05B 6/80 (2006.01)
B01D 3/42 (2006.01)

(52) U.S. Cl. ............ 219/688; 219/687; 219/746; 219/748; 219/756; 202/177; 202/181

(58) Field of Classification Search ........ 219/687–689, 219/745–751, 756, 761; 202/177, 181, 196
See application file for complete search history.

(56) References Cited

U.S. PATENT DOCUMENTS

| | | | |
|---|---|---|---|
| 3,364,731 A * | 1/1968 | Hook | 73/61.77 |
| 3,660,247 A * | 5/1972 | Franks et al. | 203/1 |
| 4,159,739 A * | 7/1979 | Brothers et al. | 165/133 |
| 4,285,774 A | 8/1981 | Rajamannan | |
| 4,417,116 A | 11/1983 | Black | |
| 4,671,951 A | 6/1987 | Masse | |
| 4,671,952 A | 6/1987 | Masse | |
| 4,673,560 A | 6/1987 | Masse et al. | |
| 4,694,133 A | 9/1987 | Le Viet | |
| D293,128 S | 12/1987 | Karamian | |
| 4,751,359 A | 6/1988 | Jamieson | |
| 4,778,969 A | 10/1988 | Le Viet | |
| 4,825,651 A | 5/1989 | Puschner et al. | |
| 4,838,694 A | 6/1989 | Betz et al. | |

(Continued)

FOREIGN PATENT DOCUMENTS

GB    2 155 612    * 9/1985

(Continued)

OTHER PUBLICATIONS

C S Pro Systems, Inc., Water Facts, http://www.csprosystems.com/waterfacts.html.

(Continued)

Primary Examiner—Philip H. Leung

(57) ABSTRACT

A microwave energy emitter (108) is positioned in a microwave transparent chamber (123) within a fluid holding vessel (106) of a microwave containment vessel (122). The fluid holding vessel (106) may be transparent to microwave energy and is further provided with a microwave reflective component outward, on, or beyond an exterior surface (121) of the wall of the fluid holding vessel (106). The microwave reflective component reflects microwaves back into the fluid holding vessel (106). The fluid holding vessel (106) encloses a material that absorbs microwave energy. An inlet path (116) and outlet path (112) is provided for material to flow in and out of the holding vessel upon predetermined conditions. Heated material can be condensed via a condenser (124) into a collection vessel (120). A controller (126) is provided to send control signals to a switching device (100) for controlling the material flow and receiving sensing signals for decision generation.

15 Claims, 5 Drawing Sheets

U.S. PATENT DOCUMENTS

| | | | |
|---|---|---|---|
| 4,956,534 A | 9/1990 | Martin | |
| 5,098,665 A | 3/1992 | Katschnig et al. | |
| D325,844 S | 5/1992 | Betts | |
| 5,130,920 A | 7/1992 | Gebo | |
| 5,179,259 A | 1/1993 | Martin | |
| 5,262,621 A | 11/1993 | Hu et al. | |
| 5,265,444 A | 11/1993 | Martin | |
| 5,286,939 A | 2/1994 | Martin | |
| 5,336,869 A | 8/1994 | Kumar | |
| 5,338,409 A * | 8/1994 | Heierli | 202/205 |
| 5,364,821 A | 11/1994 | Holland | |
| 5,387,780 A | 2/1995 | Riley | |
| 5,403,564 A | 4/1995 | Katschnig et al. | |
| 5,434,392 A | 7/1995 | Belinkoff | |
| 5,491,322 A | 2/1996 | Waligorski | |
| 5,506,391 A | 4/1996 | Burayez et al. | |
| 5,556,566 A | 9/1996 | Cappello | |
| 5,711,857 A | 1/1998 | Armstrong | |
| 5,719,380 A | 2/1998 | Coopes et al. | |
| 5,786,577 A | 7/1998 | Han et al. | |
| 5,823,676 A | 10/1998 | Khijniak | |
| 5,919,218 A | 7/1999 | Carr | |
| 6,015,968 A | 1/2000 | Armstrong | |
| 6,113,744 A | 9/2000 | Munro | |
| 6,175,104 B1 | 1/2001 | Greene et al. | |
| 6,175,105 B1 * | 1/2001 | Rubbright et al. | 219/725 |
| 6,303,005 B1 * | 10/2001 | Lautenschlager | 202/160 |
| 6,352,703 B1 | 3/2002 | Henderson et al. | |
| 6,369,371 B1 | 4/2002 | Havens et al. | |
| 6,674,054 B1 | 1/2004 | Boyers | |
| 6,730,898 B1 | 5/2004 | Machida | |
| 6,740,858 B1 | 5/2004 | Tracey et al. | |

FOREIGN PATENT DOCUMENTS

| | | | | |
|---|---|---|---|---|
| RO | 117594 | * | 5/2002 | |
| WO | WO 87/05093 | * | 8/1987 | 219/688 |

OTHER PUBLICATIONS

Dr. Joseph Mercola, Is Your Bottled Water Really Clean?, http://www.aquamd.com.
Steam Distillation Frequently Asked Questions, http://www.mizar5.com/distill/faq.html.
J. Carlton Gallawa, The High-Voltage System, The Complete Microwave Oven Service Handbook, Chapter 7; http://gallawa.com/microtech/CH7Pg1, Aug. 17, 2004.
Water Distillers, http://www1.gov.ab.ca/$department/deptdocs.nsf/all/agdex715?opendocument.
Magnetrons for Microwaves, Main Electric Supplies Ltd, http://www.mainelectronics.com/mags.html.
Magnetron Identification the Simple Way As Easy As 1 2 3!, http://www.mainelectronics.com.
Distillation for Home Water Treatment; Cooperative Extension Service, Purdue University; WQ12, Mar. 1991,http://www.ces.purdue.edu/extmedia/WQ/WQ-12.html.
H. Josef Hebert, Some Bottled Water Said Not Pure, http://www.steamdistiller.com/distil.htm#bottled.
Water Quality Parameters: An Interpretation of Test Results; http://imc.lisd.k12.mi.us/tests.html.
Drinking Water Treatment: Distillation, Nebraska Cooperative Extension G03-1493-A, http://ianrpubs.unl.edu/water/g1493.html.
Treatment Systems for Household Water Supplies: Distillation, North Dakota State University Extension Service, http://www.ext.nodak.edu/extpubs/h2oqual/watsys/ae1032w.html.
Water and Electrolyte Absorption from Hypotonic Oral Rehydration Solutions in Rat Small Intestine and Colon; Pedriatric International; http://www.blackwell-synergy.com/servlet.
Does Distilled Water Leach Minerals from the Human Body? http://www.steamdistiller.com/distil.html.
David L. Kirchner, Water From Our Oceans, Journal of Environmental Management Arizona, p. 16.
Water Distillation A Comparison, http://www.steamdistiller.com/compare.html.
Amanda J. Crawford, Toxic Groundwater Spreading, The Arizona Republic, Jul. 20, 2004, p. 1-2.
Model 2M213 Series, http://www.hkindustry.co.kr/JPG/LG/2M213_1.jpg.
H. K. Industries Co., LTD, http://www.hkindustry.co.kr/.
Water Analysis pH Determination, Advanced Biotech, http://www.adbio.com/science/analysis/ph.html.
Water—A gentle introduction to water and its structure, http:/www.chem1.com/acad/sci/aboutwater.html.
Water Science for Schools, Common water Measurements, http://ga.water.usgs.gov/edu/characteristics.html.
Phosphates, The Global Water Sampling Project, http://www.k12science.org/curriculum/waterproj/phosphates.html.
Phospates in Water Pollution, http://www.bignerds.com/show.php?eid=1319.
Drinking Water: Nitrate-Nitrogen, Nebraska Cooperative Extension G96-1279-A (Revised Nov. 1998), http://ianrpubs.unl.edu/water/g1279.htm.
Your Household Water Quality: Nitrate in Water, University of Georgia Cooperative Extension, http://aesl.ces.uga.edu/publications/watercirc/Nitrate.pdf.
Sulfate in Well Water, Minnesota Department of Health, http://www.health.state.mn.us/divs/eh/wells/sulfate.html.
Keith Mulvihill, Is Your Drinking Water Safe?, http://www.plgrove.org/water/water1.html.
Justification for Deceasing the ORS Guideline for MTBE in Drinking Water from 0.7mg/l to 0.07mg/l, http://mass.gov/dep/ors/files/mtbe70.htm.
Michael Shermer, Bottled Twaddled Is Bottled Water Tapped Out?, Scientific American.com, http://www.sciam.com/article.cfm?chanID=sa006&collD=13&articleID=000007F0-6DBD-1ED9-8E.
Singh, M; & Singh, K.P., Adult Rat Brain Changes Induced by Magnetised Water, Journal of Anatomical Society of India 51(1), (2002), p. 47-49, http://medind.nic.in/jae/t02/i.
Marilyn Chase, Rat Studies Link Brain Cell Damage with Aluminum and Fluoride in Water, Wall Street Journal, Oct. 28, 1992, http://www.fluorideaction.org/wsj-isaacson.html.
Brain Damage in Rats From Fluoridated Water, Chemical & Engineering News, Apr. 27, 1998, p. 29.
Thayer Watkins, Korean Industry Microwave Ovens, San Jose State University Economics Department, http://www2.sjsu.edu/faculty/watkins/koreaind.htm.
TMD Technologies Limited, http://www.tmd.co.uk/.
California Tube Laboratory, Inc. (CTL), http://www.caltubelab.com/info/index.html.
U.S. Trade Quick Reference Tables: Dec. 2003 Imports, Magnetron Microwave Tubes, http://www.ita.doc.gov/td/industry/otea/Trade-Detail/Latest-December/Imports/85/854071.
Magnetrons, All Appliance Parts, www.allapplianceparts.com.
Industrial Magnetrons, AWI Ltd, http://www.awimicrowaves.com/dept.asp?id=84.
Fred Senese, Is distilled water a solution?, General Chemistry Online, http://antoine.frostburg.edu/chem/senese/101/matter/faq/is-distilled-water-a-solution.
Acid Strength and Molecular Structure, http://members.aol.com/logan20/acid_str.html.
Marianne Lavelle and Joshua Kurlantzick, Water Crisis America's thirst, but is private business the answer?, U.S. News & World Report, Aug. 12, 2002, p. 22-30.
Atoms, Molecules, Water, pH, http://biology.clc.uc.edu/courses/bio104/atom-h2o.htm.
Emily Gersema, Bottled water is booming despite environmental concerns, price, http://greatlakesdirectory.org/articles/0603_bottled.html.
Distilled Water and Your Health; http://www.ecclesia.org/truth/water.html.
Superheated Water; Newton BBS; http://www.newton.dep.anl.gov/webpages/askasci/chem00/chem00636.html.
Troubled Waters, Nov. 19, 1999, http://www.sciencentral.com/articles/view.php3? article_id=218391394&cat=2_all.

Analysis of Swine Lagoons & Ground Water for Environmental Estrogens, http://www.epa.gov/ORD/NRMRL/EDC/projects/edc_cafo.html.

Dr. Terry Schultz, Estrogens in Our Water, http://notes.utk.edu/bio/unistudy.nsf/0/fe3bc6c9ad9ad7f585256e38005471b9? Open Document.

Melissa Knopper, Drugging Our Water: We Flush It, Then We Drink It, E/The Environment Magazine, vol. XIV, No. 1, http://www.checnet.org/healthehouse/education/articles-de.

Endocrine/Estrogen Letter, http://www.eeletter.com/.

H2O Microwave Criticality, http://www.vanderbilt.edu/radsafe/0001/msg00716.html.

Tobin Fricke, Exploding Microwave-Heated Water, http://splorg.org/~tobin/projects/microwave/superheating.html.

William J. Beaty, U. Washington, Unwise Microwave Oven Experiments, http://www.amasci.com/weird/microexp.html.

Seawater Desalination in California, Chapter One, California Coastal Commission, http://www.coastal.ca.gov/desalrpt/dchap1.html.

Wayne Pickering, Distilled Water, http://www.nice2know.com/articles/health/994#Distilled-Water.

Treatment Systems for Household Water Supplies Activated Carbon Filtration, NDSU Extension Service, http://www.ext.nodak.edu/extpubs/h2oqual/watsys/ae1029w.htm.

Introduction to ORP as the Standard of Postharvest Water Disinfection Monitoring, http://ucce.ucdavis.edu/freeform/common/searcher.cfm.

Section 15.1, Water, Steam, and Ice, http://howthingswork.virginia.edu/book.html.

Microwave Technology, OCETA Environmental Technology Profile, Catalog #08-003, 09-006-H, www.kinectrics.com.

Julie Beaulieu, Application Note—Temperature monitoring in wastewater purfication system, No. MC-00152R1, Oct. 8, 2002, http://www.fiso.com/index.php?module=CMS&id=94.

Spin Moves with Unexpected Ease from one Semiconductor to Another, UCSB College of Engineering Press Release, Jun. 7, 2005, http://www.engineering.ucsb.edu/Announce/spin.html.

Water Dielectric and Microwave Radiation, Jun. 7, 2005, http://www.isbu.ac.uk/water/microwave.html.

Microwave, Radio Frequency Company, Jun. 7, 2005, http://www.radiofrequency.com/microwave.html.

David D. Awschalom, Michael E. Flatte and Nittin Samarth, Spintronics, Scientific American, Jun. 2002, pp. 67-73.

Phillip Ball, Designing the Molecular World-Chemistry at the Frontier, 1999, Princeton University Press, Princeton, New Jersey, USA.

Phillip Ball, The Ingredients —A Guided Tour of the Elements, 2002, Oxford University Press, Oxford, New York, USA.

Phillip Ball, Stories of the Invisible —A Guided Tour of Molecules,m 2001, Oxford University Press, Oxford, New York, USA.

Phillip Ball, Life's Matrix —A Biography of Water, 200, Farrar, Strauss and Giroux, New York, NY, USA.

P. W. Atkins, Physical Chemistry, 1982, Oxford University Press, Great Britian, UK.

Percy Harrison and Gillian White, The Cassell Dictionary of Science, 1997, Cassell, London, UK.

Peter Atkins, The Elements of Physical Chemistry, 1940, W. H. Freeman and Company, New York, NY, USA.

Roger Penrose, The Road to Reality —A Complete Guide to the Laws of the Universe, 2004, Alfred A. Knopf, New York, NY, USA.

Sheldon I. Glashow, with Ben Boya, Interactions —A Journey Through the Mind of a Particle Physicist and the Matter of This World, 1988, Warner Books, Inc., New York, NY, USA.

John Gribbin, Q is for Quantum —An Encyclopedia of Particle Physics, 1998, The Free Press, New York, NY, USA.

McGraw-Hill Encyclopedia of Physics, Second Edition, 1993, McGraw-Hill, Inc., New York, NY, USA.

McGraw-Hill Concise Encyclopedia of Science & Technology, Third Edition, 1987, McGraw-Hill, Inc., New York, NY, USA.

* cited by examiner

MICROWAVE FLUID HEATING AND DISTILLATION METHOD

CROSS REFERENCE TO RELATED APPLICATIONS

This application claims the benefit of provisional patent application Ser. No. 60/586,675, filed Jul. 9, 2004 which is herein incorporated by references.

FEDERALLY SPONSORED RESEARCH

Not Applicable

SEQUENCE LISTING OR PROGRAM

Not Applicable

BACKGROUND OF THE INVENTION

I have invented a new apparatus, machine, and method for the heating of fluids via microwave frequencies induced into the material to be heated. The process began by trying to invent a better water distiller and purification system than the current one I am using at home. The unit I currently utilize for home has electrodes in a boiling chamber and the electrodes corrode because of the impurities in the water that supplies the house. This started me thinking how I might create a unit that would not have components that corrode because of the corrosive action of water in contact with metallic parts. To attempt a cure for this problem with the current home unit that is now being used I have installed several water conditioning units in front of it, including carbon filters and reverse osmosis filters. However this water is more "aggressive" and the units' electrodes seem to break down more rapidly and had more failures. The water purification process of the machine with electrodes heating the water is comparatively slow with the machine taking 24 hours or more to make 8 gallons of water and power intensive. The distilled water made is used mainly for drinking and cooking, as the replenishment times are prohibitively slow for other high volume usages.

Since I did not want the process to involve corrosion it seemed to me that a new way of boiling or heating water was necessary. I knew that a microwave oven could boil water but after doing the research found out that microwave ovens create "super heated water" and that boiling or steaming water was a problem in a microwave oven. I also did not want to cause microwaves to be injected into a cavity with another container in the cavity, as this seems to be a waste of power and efficiency because of the difference in the cavity geometries. This method has been utilized in U.S. Pat. No. 6,015,968 Armstrong, U.S. Pat. No. 5,711,857 Armstrong, U.S. Pat. No. 5,286,939 Martin, U.S. Pat. No. 4,694,133 Le Viet, and other patents mentioned in my patents examined further in this document. I then had the idea of building the antenna into the middle of the cavity, which held the fluid to be heated with the cavity being the wave-guide. The concept of having a remote antenna inserted into a vessel is mentioned in U.S. Pat. No. 6,175,104 Greene et al. The problem with the '104 patent is that the antenna, or emitting device, is in direct contact with the fluid to be heated. As a result of using a material that was transparent to the microwaves I could design and build a device that can have an antenna physically isolated from the cavity for water heating, be in the middle of it, and cause the fluid to be heated without any direct contact by using the cavity as a wave guide/resonance chamber. This also causes the material or fluid surrounding the cavity into which the antenna or microwave emitting device is located to be evenly irradiated by the microwaves.

Others have proposed building microwave fluid heaters with their design entailing the conventional use of a microwave generator device located off to one side of the cavity or built into the side of the cavity, as in U.S. Pat. No. DES 293,128 Karamian, U.S. Pat. No. DES 293,368 Karamian, U.S. Pat. No. 6,015,968 Armstrong, U.S. Pat. No. 4,671,951 Masse, U.S. Pat. No. 4,671,952 Masse, U.S. Pat. No. 4,694,133 Le Viet, U.S. Pat. No. 4,778,969 Le Viet, U.S. Pat. No. 4,417,116 Black, U.S. Pat. No. 5,387,780 Riley. They typically use wave-guides to direct the microwaves from the source into the cavity containing the water or fluid to be heated or steamed. This invention uses the direct output from the microwave source or antenna to heat the fluid.

Another problem with heating water in a microwave is the super heated water problem. That is, water will heat to over the boiling temperature of water at sea level of 100° C. without boiling, or going into steam. As pointed out in the article *Ask a Scientist Chemistry Archive, SuperHeated Water*, by the USA Department of Energy, obtained from the internet, water heated in a microwave in a cup will superheat the water, but will not cause it to steam. A boiling point must be established for other water molecules to boil. From the above article "Boiling begins at a temperature when the vapor pressure of a liquid equals the ambient atmospheric pressure that is above the pool of liquid. However, you WILL NOT have boiling water if there are no sites for the vapor (within the liquid) to nucleate (grow) from.

Good nucleating sites are scratches, irregularities and other imperfections inside the cup, mug, or in your case the Pyrex." Thus, when a fork is put into a cup, the super heated water then explosively boils and steams vigorously. This is also a problem with very smooth glass, such as a pyrex bowl, and presents a technical barrier to be solved in the invention that I have outlined using a pyrex boiling/wave guide chamber. One solution is to make the pyrex chamber side walls uneven and rough, while another solution is causing the fluid or matter in the chamber to be stirred by an internal force, such as a fan, or an external stimulation, such as an ultrasonic transducer or even low frequency waves, or a device that rotates when the electric field is applied due to EMF forces. This is a problem when trying to heat a fluid to a boiling point and above to produce vapor or steam. It further helps the thermal distribution through out the mixture by causing a stirring of the mixture that will even out the heating throughout the fluid or material being heated.

BACKGROUND OF THE INVENTION—OBJECTS AND ADVANTAGES

This invention is superior to other microwave fluid heaters because:

It does not use a vessel that is impervious to corrosion or degradation because of chemical reaction in the presence of heated fluid The microwave generator is surrounded by the medium to be heated and does not have any power loss due to coupling through wave guides delivering the microwaves to the medium to be heated It is very inexpensive to build It reduces power consumption by large efficiencies It can be scaled in size from very small to very large It heats the medium to be heated very quickly It can be used to purify water or other fluids inexpensively The microwave generator can be replaced quickly and inexpensively to renew or replenish the device It can generate extremely pure water without contaminates It can adapt its efficiency to the medium it is trying to heat It reduces pollution It can be used to heat water or other fluids It can be made small enough to be portable It is one of only a few viable ways to destroy estrogenic contaminates in water The microwaves directly irradiate the source, destroying bacteria and viruses that are susceptible to the wave length of the microwaves and the heat of the fluid This invention allows the material to surround the microwave source and be more evenly radiated than other inventions.

The preferred embodiments of the invention presented here are described below in the specification and shown in the drawing figures. Unless specifically noted, it is intended that the words and phrases in the specification and the claims be given the ordinary and accustomed meaning to those of ordinary skill in the applicable arts. If any other special meaning is intended for any word or phrase, the specification will clearly state and define the special meaning. In particular, most words commonly have a generic meaning. If I intend to limit or otherwise narrow the generic meaning, I will use specific descriptive adjectives to do so. Absent the use of special adjectives, it is my intent that the terms in this specification and claims be given their broadest possible, generic meaning.

Likewise, the use of the words "function," "means," or "step" in the specification or claims is not intended to indicate a desire to invoke the special provisions of 35 U.S.C. 112, Paragraph 6, to define the invention. To the contrary, if the provisions of 35 U.S.C. 112, Paragraph 6 are sought to be invoked to define the inventions, the claims will specifically state the phrases "means for" or "step for" and a function, without also reciting in such phrases any structure, material or act in support of the function. Even when the claims recite a "means for" or "step for" performing a function, if they also recite any structure, material or acts in support of that means or step, then the intention is not to invoke the provisions of 35 U.S.C. 112, Paragraph 6. Moreover, even if the provisions of 35 U.S.C. 112, Paragraph 6 are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, material or acts for performing the claimed function.

DESCRIPTION OF THE DRAWING FIGURES

SUMMARY

The principle of microwave generators, sources and amplifiers are well understood and documented. As also is the principle of heating substances with microwaves as evidenced by the current popularity of the microwave oven in modern society. Briefly, microwaves in microwave ovens cause the water in the inserted matter to vibrate at a resonant frequency (that is, their bonds) and cause the molecules to become "excited". This causes the water molecules to "bump" into each other and cause heating because of the collisions of the water molecules. This is why the substance being cooked or heated will become hot from the inside out and continue to heat even after the microwave energy source has been turned off. Microwave ovens are typically a square enclosure made of metal that reflect microwaves back into the formed cavity and have a microwave generator coupled to the enclosure through a wave-guide that directs the microwaves into the oven. This arrangement can cause hot spots in the heating of substances in the cooking cavity at the nodes of the microwave frequency lengths, so the microwaves are either "stirred" or the substance is rotated to intersect at different spots in the substance where the nodes occur. The hot spots are also caused by the geometry of the material to be heated being at different distances from the microwave source and the microwave distribution pattern from the source and the wave-guide. Furthermore, the typical microwave generator can become very hot, so a fan is used to cool the generator (of which one typical generator is called a Magnetron manufactured by LG model number 2M213-240GPo). There are many manufactures of magnetrons and microwave generators. These microwave generator devices are usually set for only one frequency, somewhere between 2.4 and 2.6 GHZ. It has been determined by others that this is the best frequency to cook foods, however other frequencies are understood to be better for other materials and substances depending upon the materials and needs and requirements. For instance, the article at URL— http://www.straightdope.com/mailbag/mmicrowave2.html, by A Staff Report by the Straight Dope Science Advisory Board, points out that 10 GHz is better for heating water molecules alone not bound in another substance. For the sake of this patent it is understood that when a frequency is mentioned for a microwave generator that it can use other frequencies than the one mentioned depending upon the application and the material used. Also, that the material heated can be a fluid, a solid, a vapor, or plasma depending upon the application and desired results.

DESCRIPTION OF THE INVENTION

Figure 1:
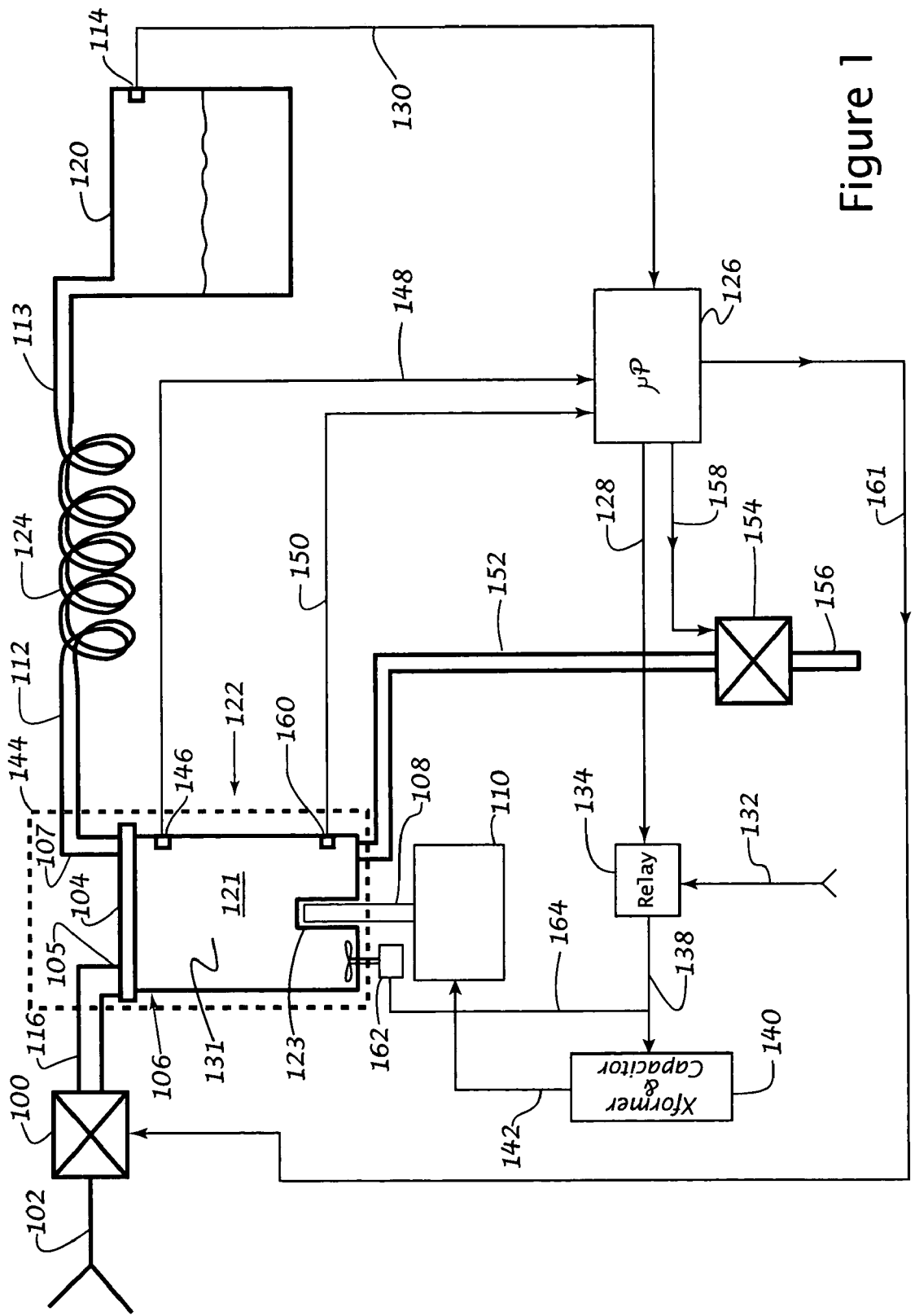
FIG. 1 is a schematic drawing of the invention used in a water distillation system.

Referring to FIG. 1, the water, fluid, or material to be heated is connected via pipe 102 to a solenoid switch 100. This description will start with the invention in a startup state and then describe a complete cycle. While this demonstrates a batch processing technique and method, it should be understood that it could also be adapted to a continuous process. Microprocessor 126, which also can be a solid state controller, state sequencer, PROM, or other signal processor/determiner, processes the signal from level sensor 114 in collection holding vessel 120 and level sensor 146 in microwave containment vessel generally 122 and determines that water should be made. (In this example water will be used, but should be considered a subset of fluids and materials that can be processed this way.) In an embodiment of the invention the apparatus comprises a signal processor/determiner 126 having at least one signal input 150 and a first level sensor 160 in communication with the signal processor/determiner 126 through a first 150 of the at least one signal inputs. The level of material in the fluid holding vessel or material holding cavity 106 of the microwave containment vessel, generally 122, is sensed by the first level sensor 160 and is communicated to the signal processor/determiner 126 by the first 150 of the at least one signal inputs. Signal processor/determiner or microprocessor 126 generates a signal to solenoid 100 via signal line 161 which opens the valve 100 and allows the material to flow into microwave containment heating chamber vessel 122, more specifically into the fluid holding vessel 106, via entry port 105 in lid or cap 104 until second level sensor 146 via signal line 148 generates a signal to microprocessor 126 that the fluid holding vessel 106 is full. Microprocessor 126 then generates a signal via signal line 161 to solenoid 100 to close and causes the material flow into microwave containment vessel 122, more specifically into the fluid holding vessel 106, to cease.

Microwave containment vessel 122 consists of material holding cavity or fluid holding vessel 106 and lid or cap 104, a level sensor 146, level sensor 160, exit port 107 for the steam, an entry port 105, and outer shell or microwave reflector 144. It can furthermore consist of a material stirrer 162 and temperature sensor (not shown). It can monitor the temperature of the water actively (not shown). Material holding cavity or fluid holding vessel 106 is made of a material that is transparent to the frequency of the microwaves being generated and can take the pressures and temperatures of the materials being heated and in contact with its interior surface. Because of the cycling of the cold water and the subsequent heating into hot water that occurs this material should be resistant to temperature cycling. This type of material can be Pyrex glass or other glass or material that fulfills these requirements. Pyrex is the trademark name for any class of heat- and chemical-resistant glass of different compositions depending on the needs and requirements of strength, weight, temperature cycling, smoothness, and other mechanical and reliability requirements. Pyrex® glass was developed by the Corning® Glass Company and was labeled Corning 7740. It is lead free and labeled a borosilicate type of glass. It was developed for its ability to withstand thermal shock created by sudden shifts in temperatures and its strength. It typically has a composition that has high resistance to strong acids or alkalis. The strain point is 510° C., annealing point of 560° C., and softening point of 821° C. makes it applicable to high heat applications. The typical composition is 80.6% $SiO_2$, 4% $NaO_2$, 13.0% $B_2O_3$, 2.3% $Al_2O_3$, and 2.3% $K_2O$.

Another Corning® glass, Corning® Vycor® 7913 would also be a contender to use for the fluid holding vessel 106. Pyrex glass can also be used as a generic term for borosilicate glass types used in the glass industry, but when used in reference to Corning® glass is a registered trademark.

Because of its composition and lack of any hydrocarbons in its formula, pyrex glass is "transparent" to microwave energy. That is, the glass does not absorb a significant amount of energy, if any, into its bonds of matter from the microwaves penetrating its matter and passes the microwaves through its matter. The usual heating of pyrex glass in a microwave operation is in the contact of the fluid or matter that is held within and in contact with its surface and the temperature flow from the heated matter to the glass containment vessel.

In addition to glass, glass that can withstand a cycle of heating and cooling, one embodiment being Pyrex, it is contemplated that other materials for making the microwave containment vessel 122 are possible, these include plastic material, carbon fiber material or ceramic material. The antenna chamber 123 could be glass, Pyrex in one embodiment, but alternative materials include plastic material or carbon fiber.

Pyrex is a good candidate because it is a smooth surfaced glass that has no pores and absorbs nothing so when it is cleaned it will not contain or transmit viruses or bacteria, nor will the surfaces be attacked by viruses or bacteria to scar the surfaces. However, because of these qualities, it does not contain a boiling point on its surface that can be used to start the water boiling process. Thus, a boiling point would be advantageous to be introduced into the fluid holding vessel 106 in some manner. One solution would be to cause the surface of the interior to be roughened, causing boiling points. Another solution is causing the shape of the fluid holding vessel 106 to be irregular that will cause nucleation sites due to the geometry of the vessel. Another solution would to have a stirrer causing the fluid or matter to be stirred by stirrer 162. Stirrer 162 is a motor, shaft and propeller. The motor would be on the outside of the fluid holding vessel 106 while the shaft penetrated the microwave vessel 144 and the propeller is on the inside. Another solution would to use a magnetic stirrer that is moved around by the introduction of a magnetic field. Another solution would be to have a device that is sensitive to microwaves and becomes excited and moves around when the microwaves are impinging upon it when the microwave source is emitting microwaves into the fluid containment vessel 106. A still further embodiment is to have the boiling point provided by a device carried in the fluid holding vessel 106.

Fluid holding vessel 106 is shaped so that an antenna chamber 123 is formed in the fluid holding vessel for the insertion of an antenna 108. The antenna 108 can be directly connected to the microwave generator 110 or be remotely connected to it via a co-axial cable for transmitting the energy from the source 110 to the antenna 108. Furthermore, antenna 108 can be of the length and size that is determined to be best for the usage. For instance, the antenna 108 can be a quarter wave, half wave, full wave, or multiple wavelength antenna. The antenna length is dependent upon the frequency used for the microwave generator source. For a 2.5 Ghz microwave, the quarter wavelength is 1.1232 inches, for the half wave it is 2.2464 inches, and the full wavelength is 4.4928 inches. For a 10 Ghz signal the quarter wavelength is 0.2808 inches, the half wave is 0.5616 inches, and the full wave is 1.1232 inches. These configurations would give the best transfer of energy into the material in the fluid holding vessel 106. The fluid holding vessel 106 should be designed such that the distance from the antenna to the microwave reflector 144 is exactly a multiple of the wavelength distance. For example, if a quarter wave antenna were used, it would be beneficial to use a quarter wave, half wave, full wave, or some other multiple of the wavelength distance to the reflector 144. The microwave/antenna 108 can also be designed to be a microwave diode operating at a predetermined frequency, of which the output is sent to a power amplifier that then sends the amplified signal to the antenna 108.

Microwave reflector 144 should be designed such that the material used reflects the microwave energy not absorbed by any of the water molecules is reflected back into the water for further absorption. It would be made of metal. Thin films are made of layers of metallic materials and could be utilized by coating the outer surfaces of the fluid holding vessel 106. The thin film coatings should be optimized for the best reflection of the microwaves back into the fluid holding vessel 106 itself. The microwave reflector reflector 144 needs to be connected to a ground so that no microwaves can escape the microwave containment vessel 122 around the apparatus. This should also apply to the microwave generator source 110 and microwave antenna 108. One of the advantages of a thin film coating on the fluid holding vessel 106 is that it can follow and be suited to the geometry of the fluid holding vessel 106. It also would be durable and lightweight. Either the Physical Vapor Deposition or Chemical Vapor Deposition or any other method that is suitable to the task could apply them.

An embodiment of the invention would have a method whereby the microwave source 110 and the antenna 108 can be removed or swung out of the way to gain access to fluid holding vessel 106 in order to facilitate the removal of the vessel for maintenance. Furthermore, fluid-holding vessel 106 can be made to unscrew or disconnect from the lid or cap 104 for replacement if necessary.

A boiling point on the surface of the material holding cavity 106 of the fluid holding vessel 122 is mentioned above. Another embodiment of a boiling point may be formed by shaping the surface of the fluid holding vessel (also known as the material holding cavity) 106 of the microwave containment vessel 122 as an irregular shape causing nucleation sites.

At this point in the cycle, when the microprocessor 126 has determined that the water in the fluid holding vessel 106 is full it will then generate a signal on signal line 128 that causes relay 134 to switch the power on to microwave source transformer and capacitor 140 to energize the microwave generator 110 and emit microwaves via antenna 108 through the antenna chamber 123 walls and cause the water inside the fluid holding vessel 106 to be heated. Also, at this time the water stirrer 162 is operated by relay 138 via power line 164.

Water is heated above its boiling point and turns into steam, whereby it exits the fluid holding vessel 106 by exit port 107, through line 112 and enters into the condensation coil 124. The coil of tubing 124 can either be cooled by blowing air across them or by using the incoming water to cool the condensing coil 124. Also, the coil 124 can be made out of copper, stainless steel, plastic, ceramic, etc. It is in this condensation coil 124 that steam is converted back to water again and is deposited through line 113 into collection holding vessel 120. It would be advantageous, but not necessary, to have a charcoal filter in the line 113 between the condensation coil 124 and the collection holding vessel 120.

The microprocessor 126 is continually checking level sensor 114 and level sensor 146 and level sensor 160 to see if the operation should be stopped at anytime. When level sensor 114 indicates that holding vessel 120 is full, then no further distilling operations will take place until level sensor 114 then indicates that it is below the level and needs more water to fill up. Instead of level sensors a mechanical float can be used.

Also, microprocessor 126 will distill water until such time that sensor level 160 indicates via signal line 150 that the fluid has been evaporated and at that time microprocessor 126 will then send a signal via line 128 and turn relay 134 off, which in turns stops the power to the microwave transformer and capacitor 140 which then stops microwave source 110 to stop emitting microwaves. It will also stop material stirrer 162 from turning, however it would be advantageous to have stirrer 162 to keep turning for a predetermined amount of time. This can be caused by either an external circuit, another and separate relay from the microprocessor 126, or by the motor and capacitor connected to the stirrer 162.

When the process is actively boiling and distilling water the microprocessor 126 can monitor the rate of evaporation and/or collection in the different vessels. By varying the frequency of the microwave source and using the above information the microprocessor can determine what is the best frequency for the best efficiency of the system and self adjust to this frequency on a predetermined basis. Thus the system can be a self-adjusting system for the maximum efficiency by using feedback.

Furthermore, when the microprocessor 126 has processed a predetermined number of water boils from the fluid holding vessel 106 the microprocessor 126 can then initiate a cleaning cycle for the fluid holding vessel 106. It does this by causing the vessel 122 to be filled, heated to a certain temperature, and then causing this water to be discharged through line 152 into a disposal water line 156 controlled by solenoid 154 that is further controlled via line 158 from microprocessor 126.

Another embodiment of the invention could have another valve on the exit port 112 (not shown) that could be controlled by the microprocessor 126. It would also have another entry port 118 (not shown) that would go to an external holding vessel 136 (not shown). Microprocessor 126 could then open the extra entry port 118 that leads to external holding vessel 136 that would contain a substance that is used to clean the fluid holding chamber 106 on a predetermined basis. The microprocessor 126 would notify the user that they should pour a substance into the external holding vessel when necessary. The microprocessor 126 would close entry port 116 and entry port 118 and exit port 112 and heat the liquid to a predetermined heating point to clean the fluid holding chamber 106. After a predetermined amount of time microprocessor 126 would open the entry port 116 and then after another predetermined time it would open exit port 152 to flush the system. After this cleansing it would begin the proper cycle of purifying the water again.

Figure 2:
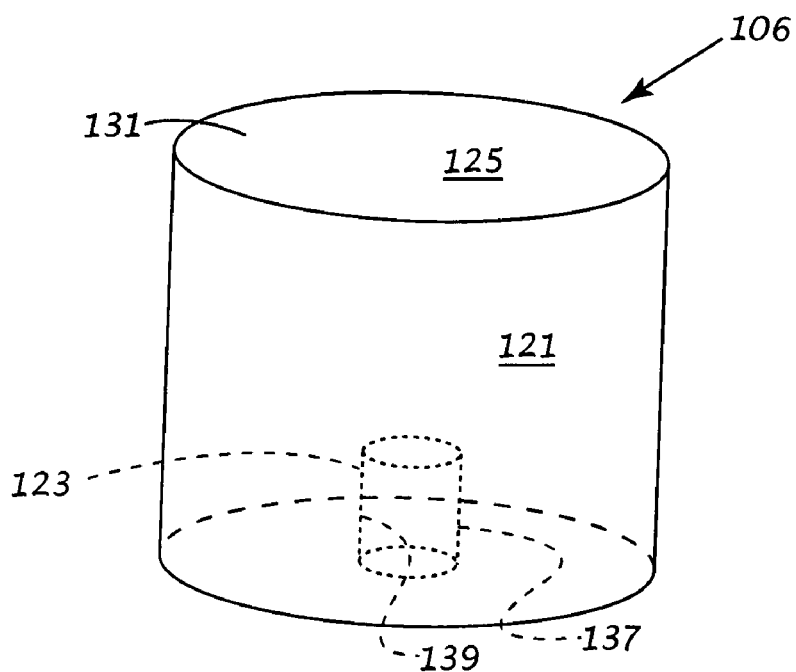
FIG. 2 is an illustration of the containment vessel with chamber I had made for this invention.
Figure 3:
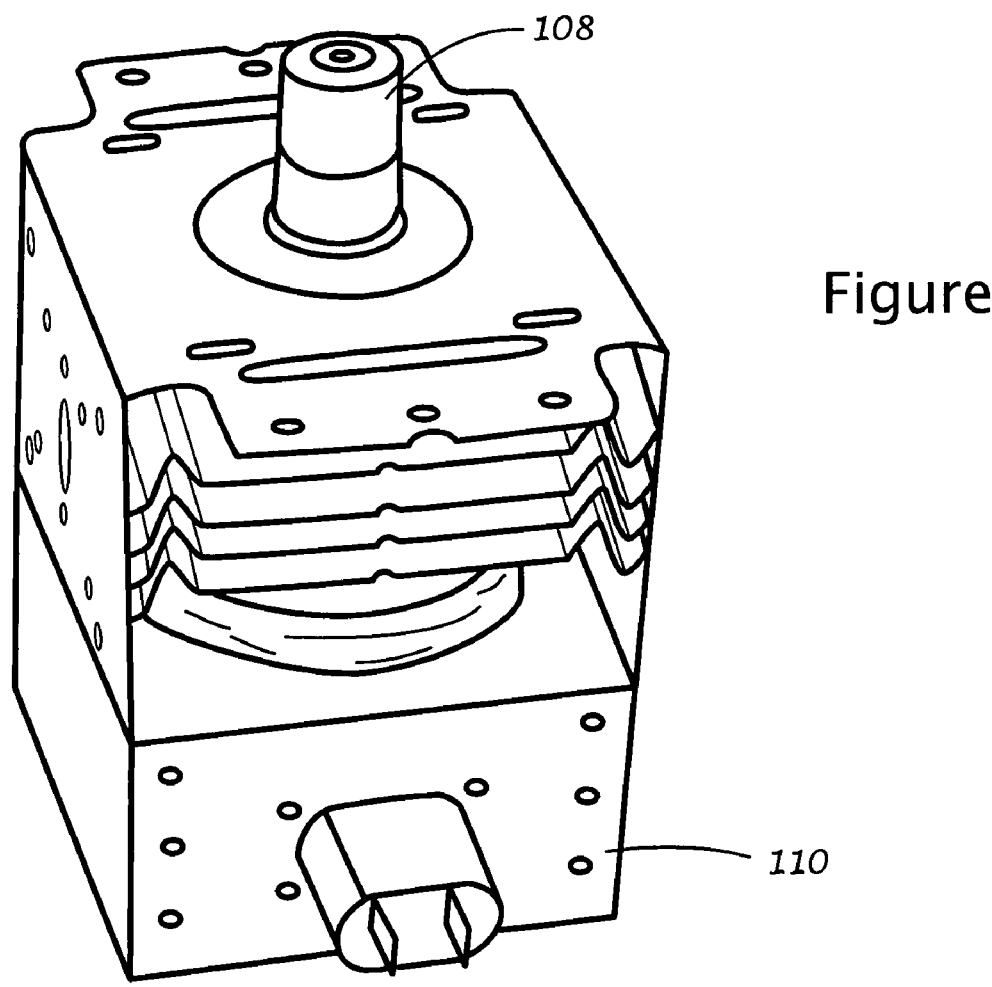
FIG. 3 is an illustration of a magnetron removed from a LG microwave oven.
Figure 4:
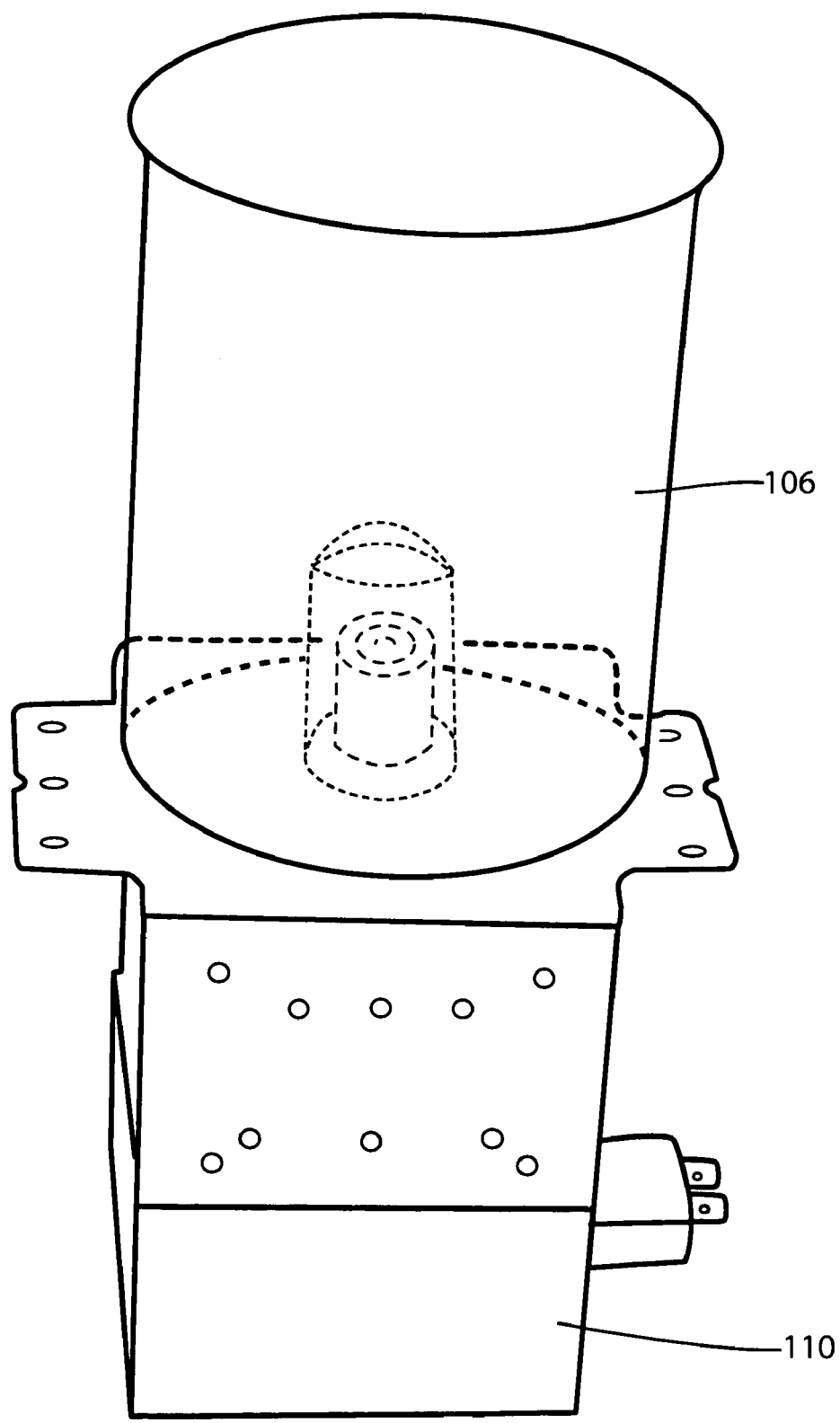
FIG. 4 is an illustration of the containment vessel with chamber sitting on a microwave generator source (magnetron) and the antenna inserted into the cavity or chamber in the containment vessel.
Figure 5:
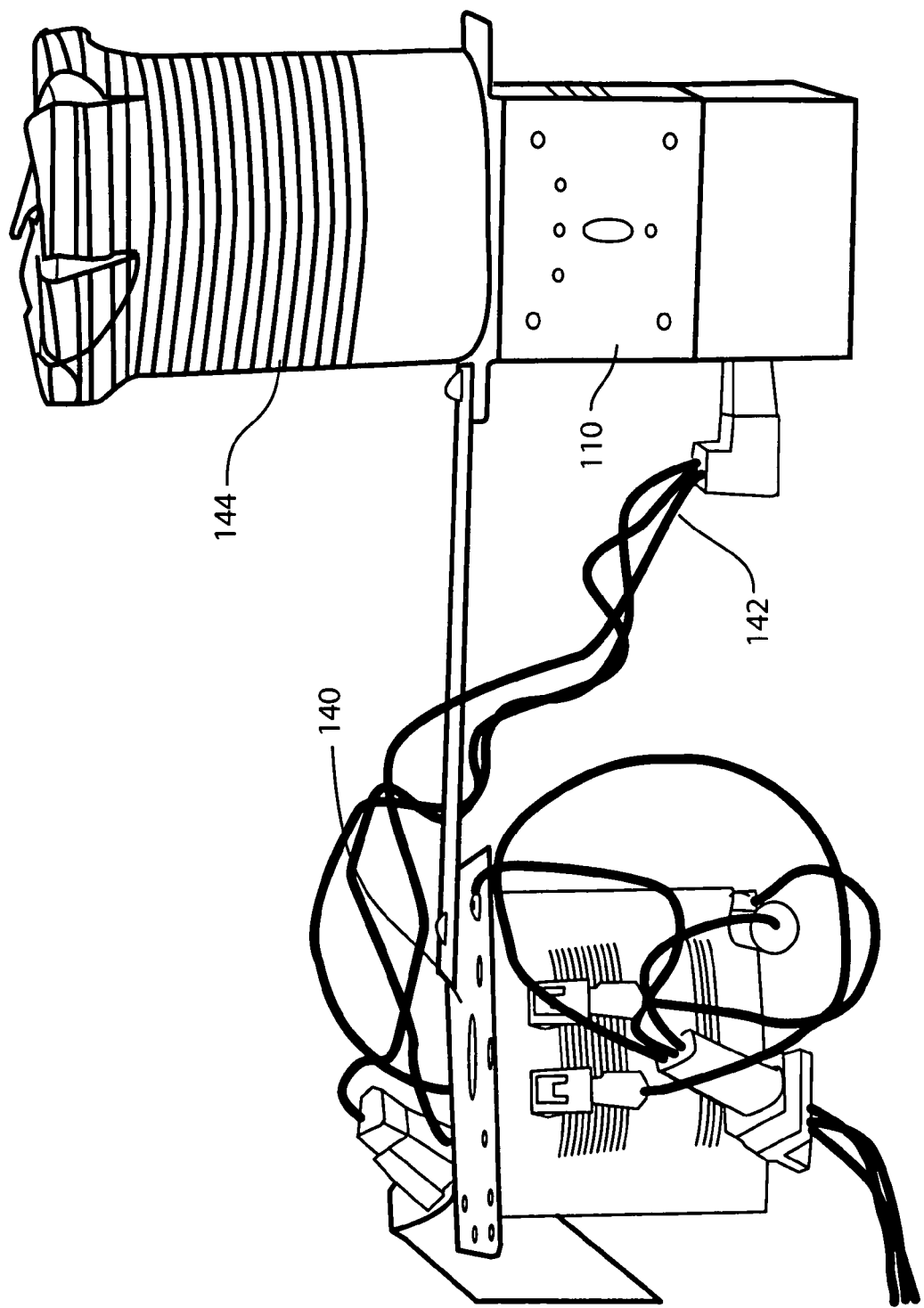
FIG. 5 is an illustration of a working breadboard and model of this invention that I built and tested.
Figure 6:
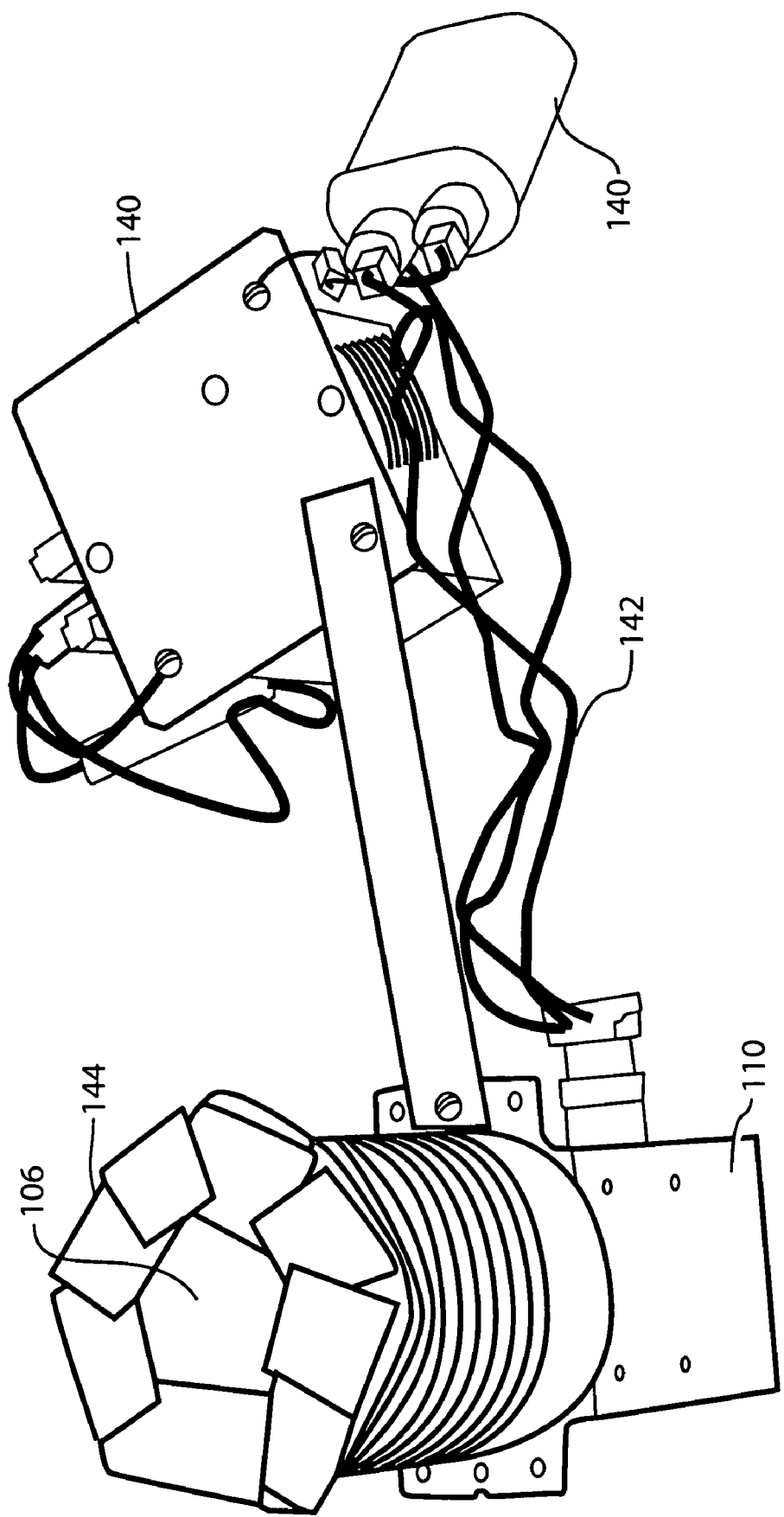
FIG. 6 is another illustration from a different viewpoint of a working breadboard and model of this invention that I built and tested.

Another embodiment of this invention could have the fluid containment vessel 106 shaped in the form of a sphere with a chamber formed therein rather than a cylinder shape as shown in FIG. 2 or FIG. 4. Any shape can be used that is suitable and is not constrained to the above mentioned shapes.

Thus, the scope of the invention should be determined by the appended claims and their legal equivalents, rather than by the examples given.

The microwave containment vessel 122 can comprise a microwave wave guide or microwave reflector 144 that comprises a layer of microwave reflective material on fluid holding vessel 106. In one embodiment fluid holding vessel 106 has an exterior surface 121 and an interior surface 125 and the layer of microwave reflective material is carried on the exterior surface 121 of the fluid holding vessel 106 but not on any surface of the antenna cavity 123 as this would prevent microwaves from the microwave antenna 108 from reaching the contents of the fluid holding vessel 106.

In addition to the microwave containment vessel 122 by itself as described above, this application teaches an apparatus which comprises a fluid holding vessel 106 having a chamber 123, the chamber 123 structure formed of a microwave transparent material as described above. The chamber 123 protrudes into a material holding cavity 131 (a "cavity" being an unfilled space within a mass and/or a space that is surrounded by something) of the fluid holding vessel 106. The apparatus may also include a microwave generator 110 with an antenna 108 connected to the microwave generator 110. The antenna 108 is positionable in the antenna chamber 123 and the antenna chamber 123 provides physical isolation between the antenna 108 and the material holding cavity 131 of the fluid holding vessel 106.

In one embodiment the apparatus described immediately above comprises a heating device and the material holding cavity 131 of the containment vessel 122 contains material. The apparatus or device is capable of heating the material in the material holding cavity 131 of the containment vessel.

In another embodiment of the invention a method for producing a distillate is contemplated. In this method for producing a distillate the apparatus for carrying out the acts of producing a distillate comprises a containment vessel 122 having a material holding cavity 131 (or material holding vessel 106) for containing material. The fluid holding vessel 106 of the microwave containment vessel 122 has a chamber 123. This chamber 123 provides physical isolation from the cavity 131 of the fluid holding vessel 106. The chamber 123, is formed of a microwave transparent material and the chamber 123 extends through a surface of the fluid holding vessel 106 and into the material holding cavity 131 of the fluid holding vessel 106. The apparatus further comprises a microwave generator 110, with an antenna 108 associated with the microwave generator 110. The antenna 108 is positionable in the chamber 123 of the fluid holding vessel 106. The apparatus also comprises a condensation coil 124 in communication with the fluid holding vessel 106. Distillate is collected in a holding vessel 120 which is in communication with the condensation coil 124.

DRAWINGS—REFERENCE NUMERALS 100 solenoid switch
102 input pipe
104 lid or cap
105 entry port
106 fluid holding vessel
107 exit port
108 microwave antenna
109 wall
110 microwave source or microwave generator
112 line
113 line
114 level sensor
116 entryport
118 extra entry port
120 collection holding vessel
121 exterior surface
122 microwave containment vessel
123 antenna chamber
124 condensation coil
125 interior surface
126 microprocessor/controller or signal processor/determiner
128 signal line
130 signal line
131 material holding cavity
132 power line
134 relay
136 external holding vessel
137 exterior surface of antenna chamber
138 power line
139 interior surface of antenna chamber
140 transformer & capacitor
142 signal line
144 microwave reflector or outer shell
146 second level sensor
148 signal line
150 first signal input
152 exit port
154 solenoid
156 waste water line
158 signal line
160 first level sensor
161 signal line
162 material stirrer
164 power line

What is claimed is:

1. In a microwave distillation apparatus including a microwave heating apparatus and a condensation device, a microwave containment vessel comprising:
    a microwave transparent material holding vessel with a wall having an exterior surface and an interior surface defining a cavity;
    an antenna chamber having a quarter wave antenna and formed in and providing isolation from the material holding vessel, the antenna chamber being transparent to microwaves and protruding through the material holding vessel wall;
    a microwave reflector on the exterior surface of the microwave transparent wall; and
    the distance between the antenna and the microwave reflector is a multiple of quarter wavelengths of the antenna.

2. The invention in accordance with claim 1 wherein the antenna chamber protrudes vertically into the material holding vessel.

3. The invention in accordance with claim 1 wherein the microwave containment vessel forms a microwave waveguide.

4. The invention in accordance with claim 1 wherein the microwave reflector comprises a layer of microwave reflective material deposited on the exterior surface of the wall.

5. The invention in accordance with claim 1 wherein the material holding vessel of the microwave containment vessel and the antenna chamber are homogenous and continuous.

6. The invention in accordance with claim 1 wherein the material holding vessel of the microwave containment vessel comprises a lid having an entry port and an exit port and the lid and the exterior surface of the structure defining the chamber are continuous.

7. The invention in accordance with claim 6 wherein the entry and exit ports are formed in the lid.

8. The invention in accordance with claim 1 wherein the microwave transparent wall of the containment vessel comprises glass.

9. The invention in accordance with claim 1 wherein the microwave transparent wall of the containment vessel comprises plastic material.

10. The invention in accordance with claim 1 wherein the microwave transparent wall of the containment vessel comprises carbon fiber.

11. The invention in accordance with claim 1 wherein the microwave transparent wall of the containment vessel comprises borosilicate glass.

12. The invention in accordance with claim 1 wherein the microwave transparent wall of the containment vessel comprises ceramic material.

13. The invention in accordance with claim 1 wherein the antenna chamber comprises glass.

14. The invention in accordance with claim 1 wherein the antenna chamber comprises plastic material.

15. The invention in accordance with claim 1 wherein the antenna chamber comprises a carbon fiber.

* * * * *